(12) United States Patent
Ochoa et al.

(10) Patent No.: US 6,384,580 B1
(45) Date of Patent: May 7, 2002

(54) COMMUNICATIONS DEVICE FOR USE WITH ELECTRICAL SOURCE

(75) Inventors: Rosibel Ochoa, Lawrenceville; Daniel T. Papalia, Suwanee; Doug Morris, Monroe, all of GA (US)

(73) Assignee: Motorola, Inc., Lawrenceville, GA (US)

( * ) Notice: Subject to any disclaimer, the term of this patent is extended or adjusted under 35 U.S.C. 154(b) by 73 days.

(21) Appl. No.: 09/645,641

(22) Filed: Aug. 24, 2000

Related U.S. Application Data

(63) Continuation-in-part of application No. 09/594,111, filed on Jun. 14, 2000.

(51) Int. Cl.[7] .................................................. G05F 1/70
(52) U.S. Cl. ....................................................... 323/207
(58) Field of Search ................................. 323/205, 207; 324/426; 363/39, 44

(56) References Cited

U.S. PATENT DOCUMENTS 5,237,507 A * 8/1993 Chasek ........................ 705/412
5,390,068 A * 2/1995 Schultz et al. ................ 361/95
6,021,052 A * 2/2000 Unger et al. .................. 363/26

* cited by examiner

Primary Examiner—Adolf Deneke Berhane

(57) ABSTRACT

One embodiment of this invention includes a source sharing circuit that is coupled to a power machine. Examples of the power machine include micro-turbine generators, gasoline engine powered generators, fuel cells, and Stirling engines. The power machine is placed in a users home as an alternate source of power. The source sharing circuitry may be coupled to a local load, the power grid and to a digital communications link. The source sharing circuitry is capable of actuation the power machine based upon a variety of factors. Additionally, the digital communications link is capable of two-way communications and transmission of many forms of data, including programs, video, audio, telephone calls and the like. Accordingly, telephones, televisions, appliances and computers may use the source sharing circuitry as a central data gateway from which to receive data from telephone networks, television and radio networks, the internet and the like.

19 Claims, 5 Drawing Sheets

COMMUNICATIONS DEVICE FOR USE WITH ELECTRICAL SOURCE

CROSS-REFERENCE TO RELATED APPLICATIONS

This application is a continuation in part of non-provisional patent application Ser. No. 09/594,111, filed Jun. 14, 2000, the disclosures of which, including all attached documents and appendices, are incorporated by reference in their entirety for all purposes.

TECHNICAL FIELD

This invention relates generally to data networking systems and, more specifically, to data communication systems for use with distributed generation networks.

BACKGROUND

Providing information delivery infrastructure, i.e. "networking", is rapidly becoming big business throughout the world. Some estimates project the networking business to grow to $2.3 billion dollars annually by the year 2003. Many players, including cable television infrastructure companies, telephone and cellular telephone infrastructure companies and even electric utilities, are rapidly entering the networking market. A common business strategy is to offer a variety of bundled services to consumers, including television, radio, telephone, internet access, home shopping, home security, and remote medical monitoring services. While there is no standard communication infrastructure, examples of some in use today include telephone lines, electric power lines, fiber optics, ethernet networks, wireless communication, infrared communication links, lasers, satellites and coaxial cables. Cable television companies are trying to become telephone service providers, while telephone companies are trying to provide cable television service.

In parallel with this growth in networking, electric utilities are becoming deregulated. Whereas a single company used to generate, transmit, distribute and market electricity, these "legacy utilities" are being broken into generation companies, transmission and distribution companies and energy marketers. As of summer 2000, public utilities in over one half of the states have experienced deregulation. Consequently, some electric utilities are beginning to diversify by offering "energy management services" in addition to raw electric energy. These services may include prepaid energy, the ability to turn on and off appliances in the home from a remote location, and some basic data transfer options through power lines. As deregulation threatens to trim profit margins, utilities want to offer new services to customers to add both value and revenue.

All three entities, telephone companies, cable companies, and utilities have difficult challenges to overcome to be high volume networking companies. Telephone companies, are limited by speed and bandwidth. When telephones were first designed, the engineers know that when people talked, the pauses between words were often longer than the words themselves. Thus, physical telephone lines were designed to "switch" to lines where people were talking while others were pausing. Thus, there is a finite capacity of physical "connectibility" for phones. When computer modems came about, computers needed a direct connection and modems thus generated a base tone to keep the phone network from switching. As a consequence, the phone lines could not switch and the finite capacity became even smaller. Fully twenty-five percent of today's telephone infrastructure still includes these analog switches. When that capacity is filled by users, no new users can be accommodated.

Cable companies on the other hand, must deal with the issue of the "reverse path" problem. Cable networks were designed to deliver information one-way: from the television station to your home. The internet, on the other hand, requires data to flow in two directions, both to and from the computer. The only way to accommodate this two-way communication is to design special amplifiers to send the reverse signal upstream. The problem is that, as cable networks are designed as a hub and spoke system, problems with an amplifier in one spoke can compromise the entire wheel.

The utility is at a distinct disadvantage because it does not have an infrastructure across which to transmit large amounts of data. Utility lines connect to large, oil-filled power transformers to step-up and step-down voltage levels. As utility company can only "piggyback" data on top of electric power, these transformers limit data transmission to much slower rates.

There is thus a need for an improved data networking device.

DETAILED DESCRIPTION OF THE INVENTION

Figure 1:
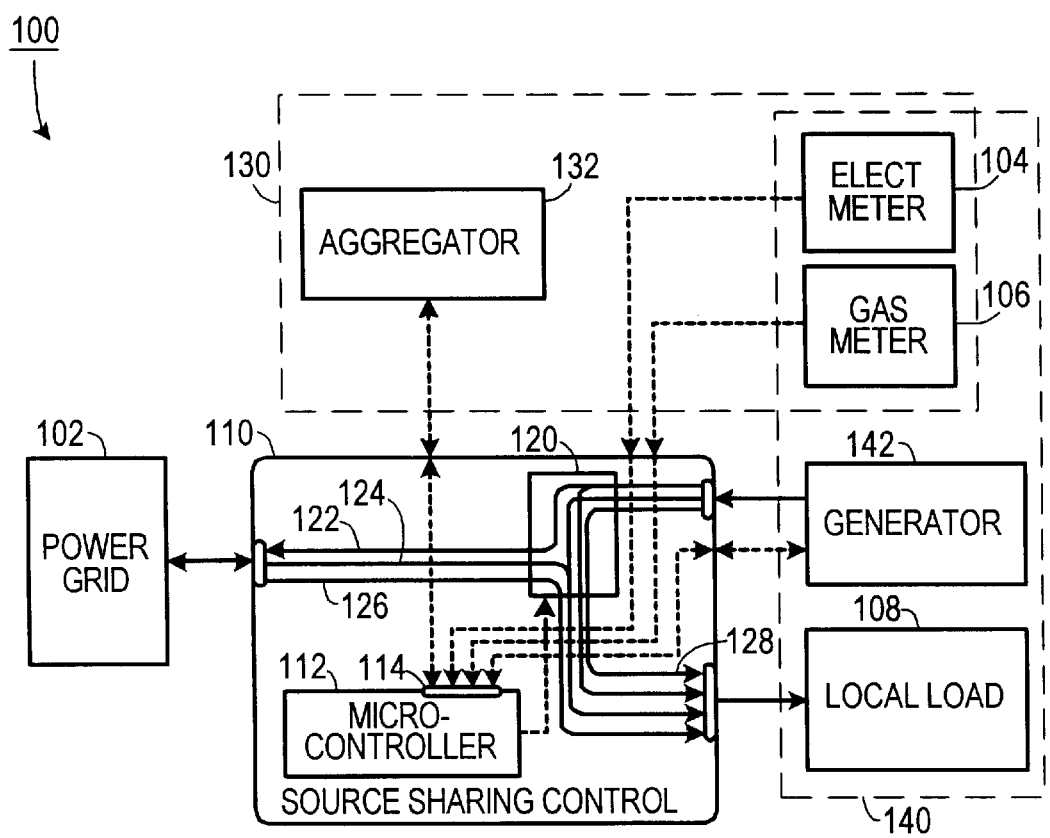
FIG. 1 illustrates a power machine in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, the term "generator" is to mean any device capable of generating electric power. The term "microcontroller" and "microprocessor" are used interchangeably.

One embodiment of this invention includes a data communication device coupled to a distributed generation power machine. The power machine includes a source sharing control circuit capable of actuating the power machine as well as operating the power machine in a variety of configurations. The data communications device includes both a data communications link and data processing circuitry such that the power machine can provide a singular information gateway to a customer. This invention can efficiently and economically provide energy management capability and data communication services.

While telephone companies attempt to provide comprehensive communications to customers, they are prohibited by bandwidth. Approximately 25% of the U.S. telephone switching capacity is still analog with physical moving parts. These were designed to switch narrow-band signals and not be sufficient for future communications services. In addition, using statistical call figures, the switches were designed with at 20:1 service ratio. This ration insured that a call would be blocked less than 0.5% of the time due to system over usage. With the advent of the Internet and ISDN, a system with 10,000 lines could be clogged if 500 ISDN users left their computers on 24 hours a day.

Cable companies are better positioned than their telephone counterparts in terms of bandwidth, but they do have transmission issues. The original design of the cable system is similar to the power system. Signals were meant to travel in only one direction, and at the residential level, which is closer to a hub and spoke system than an interconnected grid. Consumers on the same spoke share a signal as opposed to the telephone system, which uses discrete point-to-point connections. As a result, the coaxial cable lines have enormous bandwidth but the lack of individual connections greatly complicate directed data transfer. While cable companies can employ packet headers like those used in cellular networks, this type of routing is much slower than desecrate connections.

Referring now to FIG. 1, a power machine as described in the parent application is illustrated. This embodiment 100 includes a source sharing control circuit 110 that configures power connection s between a power grid 102, a local generator 142 and a local load 108. Typically, the local load 108 includes electrical appliances situated at a local site 140 such as a house or place of business. The local generator 142, and electric meter 104 and a fuel meter 106 would be at the local site 140. The generator 142 may be a small capacity generator, including a micro-turbine generator, gasoline engine powered generator, fuel cell, Stirling engine, or other device capable of generating electric power.

The source sharing control circuit 110 receives information from an external data source 130. The data source 130 could include an aggregator 132, a data input form the electric meter 104 and a data input from the gas meter 106. An aggregator is an entity that produces data regarding the economic costs involved in receiving power from the power grid 102 and ingenerating power from the generator 142. For example, the aggregator 132 may provide the current price of electric power and the current price of natural gas for the generator. The aggregator 132 may, on the other hand, provide a simple binary indication of whether current price conditions favor local power generation versus taking power from the grid 102.

The source sharing control circuit 110 includes a microprocessor 112 and a power circuit 120 that is capable of configuring power connections within the source sharing circuit 110 based on instructions received from the microprocessor 112. The microprocessor 112 receives information from the data source 130 via a data port 114 and determines a preferred source-sharing configuration based upon the data received from the data port 114. The microprocessor 112 instructs the power circuit 120 to affect the preferred source-sharing configuration. Such source sharing configurations include a first configuration 126 in which the local load 108 is fully powered by the local generator 142; a second configuration 128 in which the local load is fully powered by the local generator 142, and a third configuration 124 wherein the local load 108 is partially powered by the power grid 102 and partially powered by the local generator 142. The microprocessor 112 may also cause the power circuit 120 to isolate the local generator 142 from the power grid 102 upon sensing a power failure on the power grid 102.

A possible fourth configuration 122 is possible, wherein the local load 108 is fully powered by the local generator 142 and wherein the power gird 102 receives power from the local generator 142. This fourth configuration 122 allows the owner of the local generator 142 to sell power back to the grid 102. The microprocessor 112 may have to be programmed to execute a net metering mode, wherein the microprocessor 112 monitors the electric meter 104 to determine the current value of the local utility bill and excludes the fourth configuration 122 when the current local utility bill value is not greater than a predetermined threshold value, such as zero. This mode would be used when local law prohibits the utility from having to pay for power received from a local generator in excess of a credit equal to an existing balance on a utility account.

Figure 2:
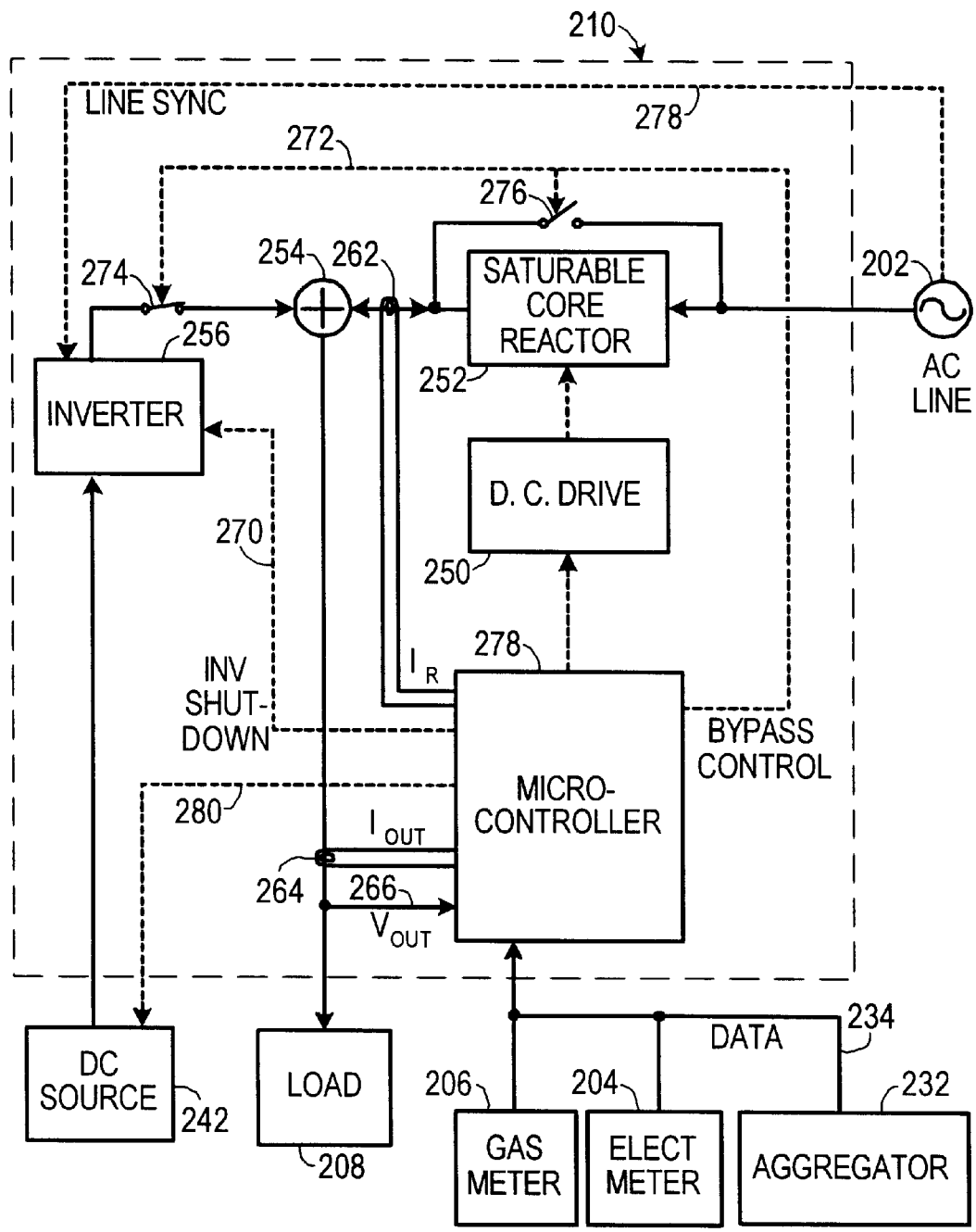
FIG. 2 illustrates one embodiment of a source sharing control circuit in accordance with the invention.

Referring now to FIG. 2, one embodiment of a control circuit 210 is shown. The control circuit 210 includes an inverter 256 that converts direct current (DC) from the generator 242 into alternating current (AC). A saturable core reactor 252 controls the amount of AC that is allowed to flow from the power grid 202. The AC from the inverter 256 is summed with the AC from the saturable core reactor 252 by a summation circuit 254 and then delivered to the load 208 A line sync signal 210 is tapped off of the power grid 202 to provide the inverter 256 with a sync input so that the output of the inverter 25 is synchronized with the output of the saturable core reactor 252. While this embodiment includes the saturable core reactor, the control circuit could equally be made with a dual phase buck converter to step down the voltage level from the power grid 202.

Figure 3:
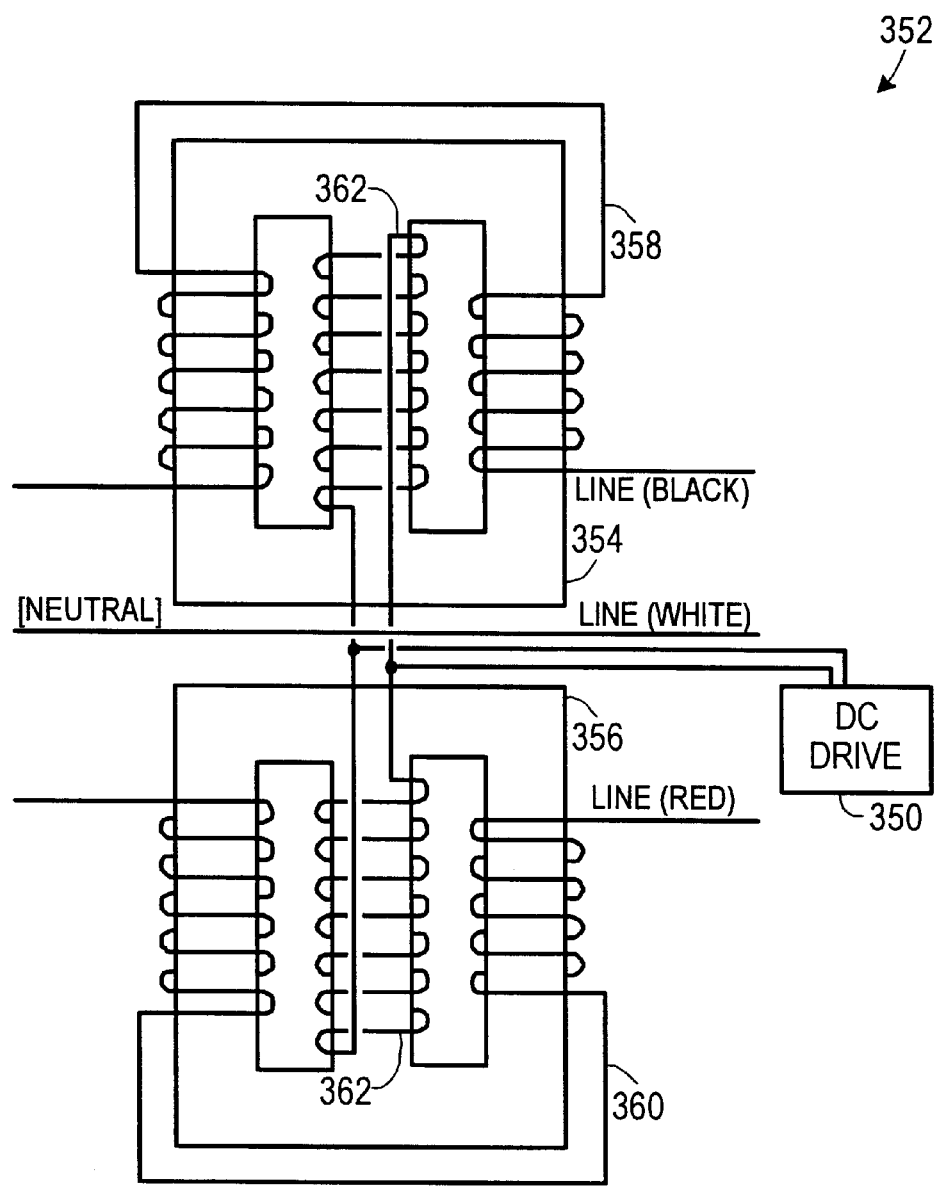
FIG. 3 illustrates a saturable core in accordance with the invention.

Referring now to FIG. 3, one embodiment of a saturable core reactor 352 is illustrated therein. The reactor 352 includes a first silicon steel core 354 and a second silicon steel core 356. The first silicon steel core 354 includes a first outer winding 358 that receives AC power from the black line of a 220V power input from the power grid. The second silicon steel core 356 includes a second outer winding 360 that receives AC power from the red line of the 220V power input from the power grid. Both cores 354 and 356 have an inner winding 362 that is driven by the control signal from the DC drive circuit 350. Thus, the amount of current that is allowed to flow through the outer windings 358 and 360, and therefore the corresponding red and black lines, is a function of the strength of the control signal received from the DC drive circuit 350.

Figure 4:
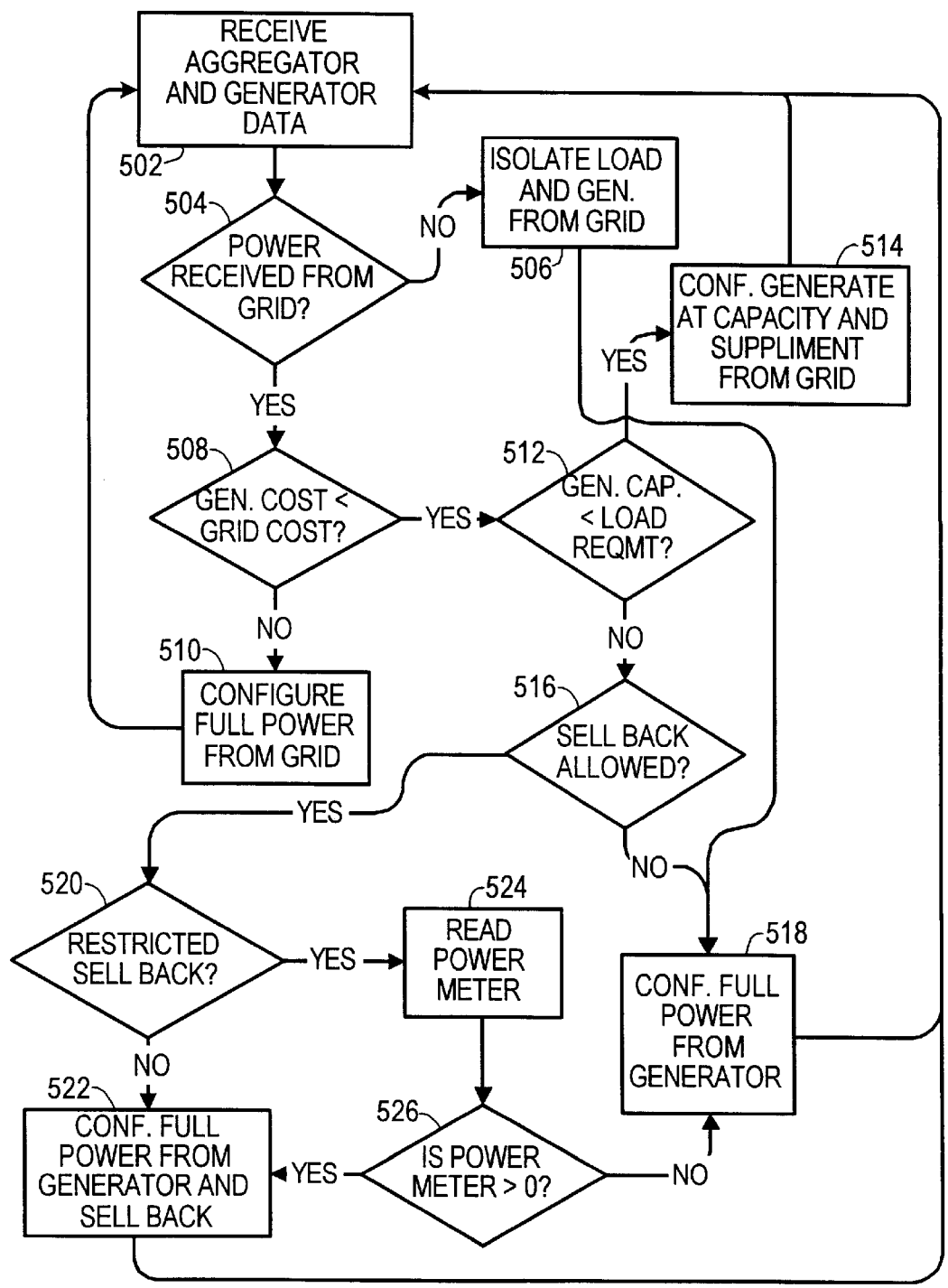
FIG. 4 illustrates an exemplary decision tree in accordance with the invention.

Referring now to FIG. 4, a flow diagram illustrating the decision program embedded in the microprocessor of the control circuit is illustrated therein. This flow diagram is one illustrative embodiment of the many ways that the microprocessor can be programmed within the scope of the invention. The actual program employed would depend upon the specifics of the application for which the invention is to be used.

Figure 5:
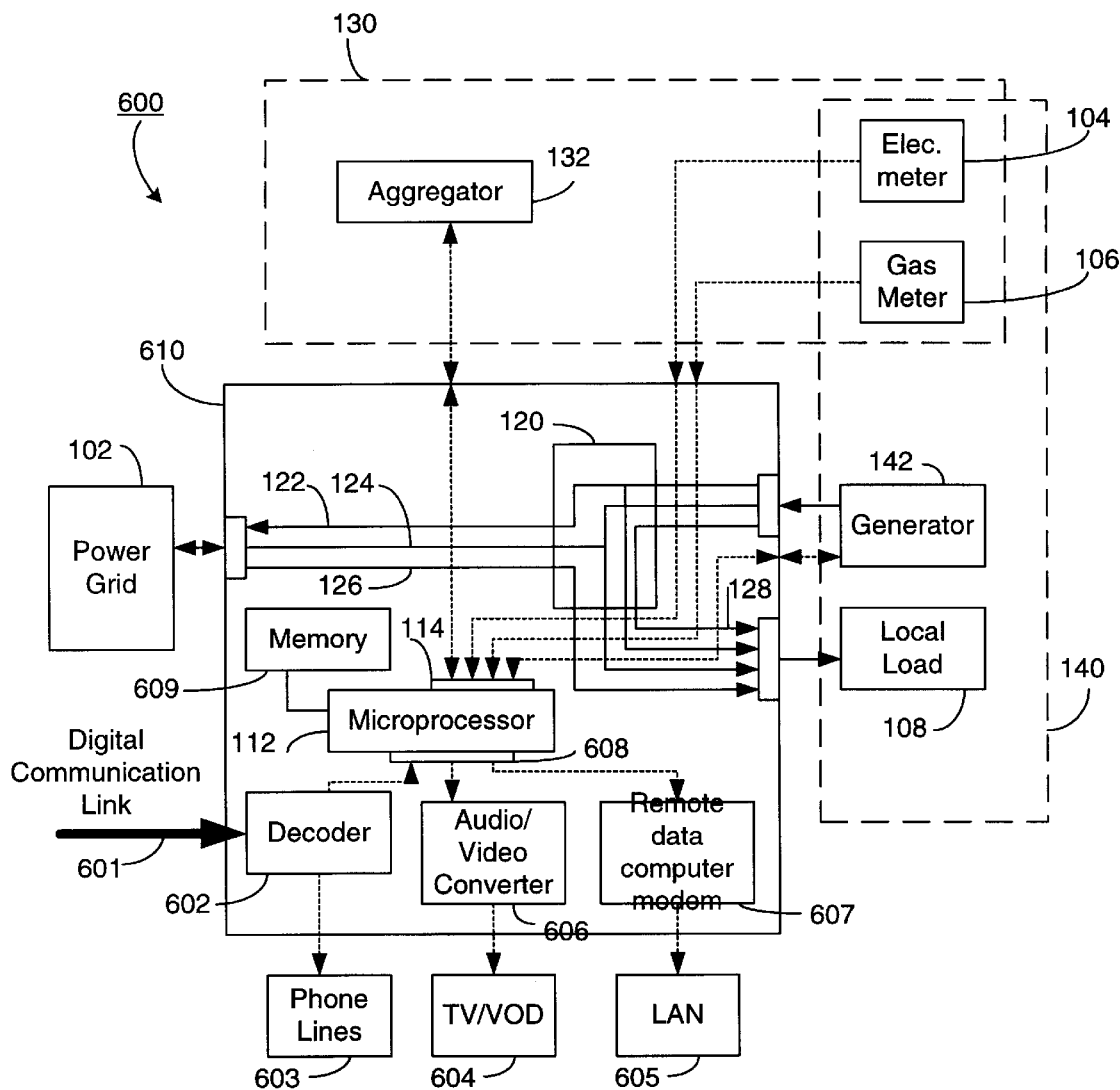
FIG. 5 illustrates a power machine with digital communications circuitry in accordance with the invention.

Referring now to FIG. 5, illustrated therein is a source sharing circuit having digital communication capabilities 600. The source sharing circuit 610 comprises the microprocessor 114 and the power circuit 120 as previously described. Additionally, the source sharing circuit 610 includes a digital communications link 601 that is coupled to a decoder 602. The decoder 602 is coupled to the microprocessor 112, a audio/video converter 606 and to telephone lines 603. An optional computer modem 607 is coupled to the microprocessor 112 and to a local area network (LAN) 605. The microprocessor 112 is also coupled to a memory module 609.

The digital communications link 601 is a two-way interface capable of sending and receiving data in digital form. The digital communications link 601 could be any of the following: telephone lines, electric power lines, fiber optics, ethernet networks, wireless communication, infrared communication links, lasers, satellites and coaxial cables. In a preferred embodiment, the digital communications link 601 comprises a connection to the internet through which one may access the source sharing circuit from devices including a computer, wireless personal data assistant, or wireless application protocol (WAP) phone.

In one embodiment, the digital communications link 601 can receive software commands that are transmitted to the microprocessor 112. These commands may include information related to the status and actuation of the generator 142, as well as actuation commands for the local load 108. One example of controlling the local load 108 includes having appliances connected to a circuit breaker box coupled to the source sharing control circuit circuit 610. If the user wants to turn on the air conditioning, for example, he may send an e-mail (a form of digital information) to the source sharing circuit 610 requesting that the microprocessor 114 actuate the air conditioner via the breaker box.

Other types of digital information may be transmitted across the source sharing control circuit 610 as well. For example, digital video and audio may be transmitted, including television broadcasts, movies and the like. In this scenario, the decoder 602 takes the digital bits transmitted in accordance with the transmission protocol and translates them into a binary format that the microprocessor 112 can understand. In this sense, the decoder 602 acts as a communications gateway. The microprocessor 112 then recognizes the difference between a video broadcast, which may use a digital satellite service (DSS) protocol, from an internet message, which might use a hypertext transfer protocol (HTTP). Once the difference is detected, the microprocessor 112 multiplexes the information to direct it to the appropriate device.

In the preceding example, the video signal would be sent to an Audio/Video converter 606 that converts the digital video to an analog signal capable of being viewed on a conventional television set. This signal is then sent to a television 604. Essentially the decoder deals with the signal transmission protocol for media sent over a network. The other digital processors, like the audio/video converter 606 for example, then take the data after transmission and interpret it into meaningful information for that particular device.

In a likewise manner, the decoder 602 directs phone calls to conventional phone lines 603. Digital information like web pages and e-mail are sent first to a remote computer modem 607 and then to a local area network (LAN) 605. The remote computer modem may comprise a conventional modem and phone line or an Ethernet connection. The LAN may connect to computers, appliances and wireless computing devices.

The memory module 609 stores programs sent to the microprocessor 114 over the digital communication link. These programs may include actuation algorithms for appliances that tell them when to turn on or off. For example, if the user wants his air conditioning to come on every Monday, Wednesday, and Thursday at seven, but not until eight on Tuesday and Friday, this information would be stored in the memory module 609. Additionally, the microprocessor 114 may monitor the run times of appliances to give the user a means to audit his energy usage. This information could equally be stored in the memory module 609 and later downloaded to a computer through the remote computer modem 607 and LAN 605. The memory module 609 may be either volatile memory like random access memory (RAM), or non-volatile memory like an electrically erasable programmable read-only memory (EEPROM) or flash RAM.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the remote computer modem has been described as either a conventional modem or ethernet, the connection between a remote computer and the source sharing circuitry could be numerous other connections, including fiber optics, lasers, and wireless radio frequency connections.

What is claimed is:

1. A source sharing control circuit comprising:
   a. a power circuit for coupling to a power generator capable of actuating a plurality of source sharing configurations;
   b. a microprocessor coupled to the power circuit;
   c. a decoder coupled to the microprocessor;
   d. a digital communications link capable of both receiving data from and sending data to an external source coupled to the decoder; and
   e. a plurality of data connections coupled to the microprocessor, wherein the digital communications link provides an information gateway to a user; further wherein the microprocessor is capable of being controlled from a remote location via the data received from the external source.

2. The source sharing control circuit of claim 1, further comprising a memory module coupled to the microprocessor.

3. The source sharing control circuit of claim 2, further comprising a conventional telephone lines coupled to the decoder.

4. The source sharing control circuit of claim 3, further comprising an audio/video converter.

5. The source sharing control circuit of claim 4, further comprising a remote computer modem.

6. The source sharing control circuit of claim 5, wherein the power generator is selected from the group consisting of micro-turbine generator, gasoline engine powered generator, fuel cell, and Stirling engine.

7. The source sharing control circuit of claim 6, wherein the digital communications link is selected from the group consisting of telephone lines, electric power lines, fiber optics, ethernet networks, wireless communication, infrared communication links, lasers, satellites, and coaxial cables.

8. The source sharing control circuit of claim 7, wherein one of the plurality of data connections comprises a receptacle capable of accommodating a television set.

9. The source sharing control circuit of claim 7, wherein one of the plurality of data connections comprises a receptacle capable of accommodating a local area network.

10. A power machine controller comprising:
    a. a source sharing control circuit having a microprocessor, a power circuit, a memory module and a decoder;
    b. a digital communications link coupled to the decoder;
    c. a connection to accommodate an electric meter coupled to the source sharing circuit;
    d. a connection to accommodate a fuel meter coupled to the source sharing circuit;

e. a connection to accommodate a personal computer coupled to the source sharing circuit, f. a connection to accommodate a television coupled to the source sharing circuit, and g. a connection to accommodate a telephone coupled to the source sharing circuit;

wherein the power machine is coupled to both a power grid and a local load.

11. The power machine of claim 10, further comprising an audio/video converter.

12. The power machine of claim 11, further comprising a remote computer modem.

13. The power machine of claim 12, wherein the power circuit is capable of actuating a plurality of source sharing configurations.

14. The power machine of claim 13, wherein the plurality of source sharing configurations comprises:

a. a first configuration in which the local load is fully powered by the power grid;

b. a second configuration in which the local load is fully powered by the local generator; and c. a third configuration in which the local load is partially powered by the power grid and partially powered by the local generator.

15. The power machine of claim 14 wherein the plurality of source sharing configurations comprises a fourth configuration in which the local load is fully powered by the local generator and in which the power grid receives power from the local generator.

16. The power machine of claim 15 wherein the microprocessor is capable of actuating the local load.

17. A method of communicating with electric devices, the method comprising the steps of:

a. providing a source bring control circuit comprising:

i. a power circuit for coupling to a power generator capable of actuating a plurality of source sharing configurations;

ii. a microprocessor coupled to the power circuit;

iii. a digital communications link capable of both receiving data from and sending data to an external source; and iv. a plurality of data connections coupled to the microprocessor;

wherein the digital communications link provides an information gateway to a user; further wherein the microprocessor is capable of being controlled from a remote location via the data received from the external source;

b. transmitting digital information to the source sharing control circuit via the digital communications link;

wherein the source sharing control circuit directs the digital information to a local device.

18. The method of claim 17, wherein the digital information is in a form selected from the group consisting of microprocessor command, microprocessor program, audio signal, video signal, telephone call, e-mail, and internet data.

19. The method of claim 18, wherein the local device is selected from the group consisting of telephone, computer, television, radio, MP3 player, local area network, household appliance, personal digital assistant and circuit breaker box.

* * * * *